Patented Aug. 28, 1951

2,565,783

UNITED STATES PATENT OFFICE 2,565,783

POLYMERIZATION OF UNSATURATED COMPOUNDS UTILIZING A CATALYST MIXTURE

Ferdinand Leonard Maria Schouteden and Remi Gustaaf Tritsmans, Antwerp, Belgium, assignors to Gevaert Photo-Producten N. V., Mortsel-Antwerp, Belgium, a company of Belgium No Drawing. Application May 16, 1947, Serial No. 748,656. In Germany August 4, 1943

Section 1, Public Law 690, August 8, 1946
Patent expires August 4, 1963

4 Claims. (Cl. 260—89.1)

This invention relates to the polymerisation of unsaturated organic compounds and more especially of vinyl compounds.

It has particular reference to catalysed suspension or emulsion polymerisation in an aqueous medium.

As is well known, polymerisation is speeded up by the presence of certain catalysts, for instance oxygen or ozone or organic or inorganic peroxides. However, these catalysts do not give full satisfaction concerning the speed of polymerisation, because in their presence polymerisation only starts after a certain period, called the induction-period. In order to shorten this induction-period, it has been proposed to use, instead of a single catalyst, a mixture comprising a per-compound and a small quantity of an organic acid or acid anhydride. Mixtures of hydrogen peroxide with organic peracids or with compounds which under the conditions of reaction act as organic peracids, were also used for this purpose.

It is further known that high molecular products of great solubility may be obtained by operating with peroxides of fatty acids containing at least four carbon atoms.

None of these ways of proceeding were fully satisfactory, because an increase of the polymerisation speed was always accompanied by a decrease of the degree of polymerisation.

It is an object of this invention to provide a process of polymerisation of unsaturated compounds and quite especially vinyl esters, which yields fully satisfactory results.

In this process a mixture of catalysts is present consisting of a main catalyst and a smaller proportion of a second catalyst which mixture acts towards increasing both the speed of polymerisation and the degree of polymerisation of the end product.

We believe the increase of the degree of polymerisation in the presence of a well defined proportion of a second catalyst to be explained by a high selective increase of the speed of the reaction and of the chain growth, without influencing the chain-breaking and even retarding this latter reaction. This practically means that a product of very high polymerisation degree is obtained within a very short period of time.

By main catalyst we understand an organic peroxide, such as for instance benzoyl peroxide or butyryl peroxide. The second catalyst may be free oxygen in any form, or an inorganic peroxide such as hydrogen peroxide, and in a general way compounds which split off oxygen, such as alkali persulfate.

The catalyst which is added in the usual quantity, contains per 1 part by weight of the main catalyst a proportion ranging between 0.05 part and 0.8 part, of the second catalyst. The catalysts according to the present invention need not be chemically pure, but may be used in crude form. We may for instance use a fraction of the reaction-mixture wherein the catalysts are prepared.

The monomers may be dispersed or emulsified with the aid of the usual emulsifying and stablising agents.

In the following examples which shall only serve to illustrate our invention without in any way limiting its scope, the degree of polymerisation is expressed in terms of the viscosity of a primary molecular solution in benzene or another suitable solvent of the end product at 20° C., expressed in centipoises (cp.), the solvent being the same in each example for the compared polymers.

Example 1

100 parts by weight vinyl acetate in which 0.05 part dibenzoyl peroxide is dissolved, are poured under stirring together with 1 cubic centimetre of a 1% hydrogen peroxide solution (equal to 0.01 part) into 100 parts of an aqueous 2% solution of polyvinyl alcohol. After 6 hours' heating at 70° C. polymerisation has come to an end. After filtering, washing and drying, 85 parts of the white polymer are obtained. Its primary molecular solution in benzene has a viscosity of 150 cp. When polymerising under identical conditions, but without the addition of hydrogen peroxide, the polymer obtained has a viscosity of 92 cp. only.

Example 2

100 parts vinyl acetate, in which 0.1 part benzoyl peroxide is dissolved, are poured under stirring together with 4 cubic centimetres of a 1% hydrogen peroxide solution (0.04 part) into 100 parts of an aqueous solution of cellulose methylether. One part of this dispersion is heated in a boiling waterbath, the other part being added when polymerisation sets in. After heating for 6 hours 90 parts of a polymer are obtained. Its primary molecular solution in benzene has a viscosity of 130 cp. When polymerising under identical conditions, but without adding hydrogen peroxide, the viscosity of the polymer is only 10 cp.

Example 3

100 parts vinyl acetate in which 0.1 part benzoyl peroxide is dissolved, are poured under stirring into 100 parts water and 0.02 part potassium persulfate. After 6 hours' heating at 70° C. a polymer is obtained. Its primary molecular solution in benzene has a viscosity of 42 cp., while the product prepared without adding potassium persulfate has a viscosity of only 10 cp.

*Example 4*

100 parts water, 0.1 part dibutyryl peroxide and 5 cubic centimetres of an aqueous 1% hydrogen peroxide solution (0.05 part) are mixed in a stirring autoclave. 100 parts vinyl chloride are then forced in and the autoclave is heated for 10 hours at 70° C. In this way a polymer in the form of a very fine powder is obtained. Its primary molecular solution in tetrahydrofuran has a viscosity at 12 cp. Under the same conditions but without hydrogen peroxide, a polymer with a viscosity of only 8 cp. is obtained.

*Example 5*

100 parts vinyl acetate, in which 0.1 part dibutyryl peroxide is dissolved, are poured under stirring together with 1 cubic centimetre of a 1% hydrogen peroxide solution (0.01 part) into 100 parts of an aqueous solution of cellulose methylether. Part of this dispersion is heated in a boiling water-bath, the rest being added when polymerisation sets in. After heating for 6 hours, 90 parts of a polymer are obtained, whose primary molecular solution in benzene has a viscosity of 113 cp. When polymerising under the same conditions, however, without the addition of hydrogen peroxide, the viscosity of the polymer is only 33 cp.

The polymers obtained according to the present invention are characterised by a relatively higher molecular weight, which of course is technically of the greatest importance in view of the close connection between the degree of polymerisation and the mechanical properties.

We wish it to be understood that we do not desire to be limited to the foregoing examples nor to the details given above, for obvious modifications will occur to a person skilled in the art.

We claim:

1. A process which comprises heating at a temperature ranging between 50° and 90° C., an aqueous suspension of 100 parts by weight of a vinyl ester in the presence of a catalyst mixture containing per said 100 parts of vinyl ester between .05 and 0.1 part of an organic peroxide selected from the group consisting of benzoyl peroxide and dibutyryl peroxide, and hydrogen peroxide in an amount between about 0.2 part to 0.8 part per part of the organic peroxide present.

2. The process of claim 1 in which the ester is an acetate and the catalyst contains .05 part benzoyl peroxide and from about .01 to .04 part of hydrogen peroxide.

3. The process of claim 1, in which the ester is an acetate and the catalyst contains .1 part benzoyl peroxide and from about .02 to .08 part of hydrogen peroxide.

4. The process of claim 1, in which the ester is a chloride and the catalyst contains .1 part dibutyryl peroxide and from about .02 to .08 part hydrogen peroxide.

FERDINAND LEONARD MARIA SCHOUTEDEN.
REMI GUSTAAF TRITSMANS.

REFERENCES CITED

The following references are of record in the file of this patent:

UNITED STATES PATENTS

| Number | Name | Date |
|---|---|---|
| 1,586,803 | Hermann et al. | June 1, 1926 |
| 2,109,595 | Marks | Mar. 1, 1938 |
| 2,300,566 | Hahn et al. | Nov. 3, 1942 |
| 2,401,445 | White | June 4, 1946 |
| 2,426,476 | Vaughan et al. | Aug. 26, 1947 |

FOREIGN PATENTS

| Number | Country | Date |
|---|---|---|
| 906,863 | France | Feb. 22, 1946 |